Jan. 31, 1967 J. C. TROPEANO ETAL 3,301,485
METHOD AND APPARATUS FOR MAKING FROZEN PARTICLES
Filed Sept. 14, 1964 3 Sheets-Sheet 1
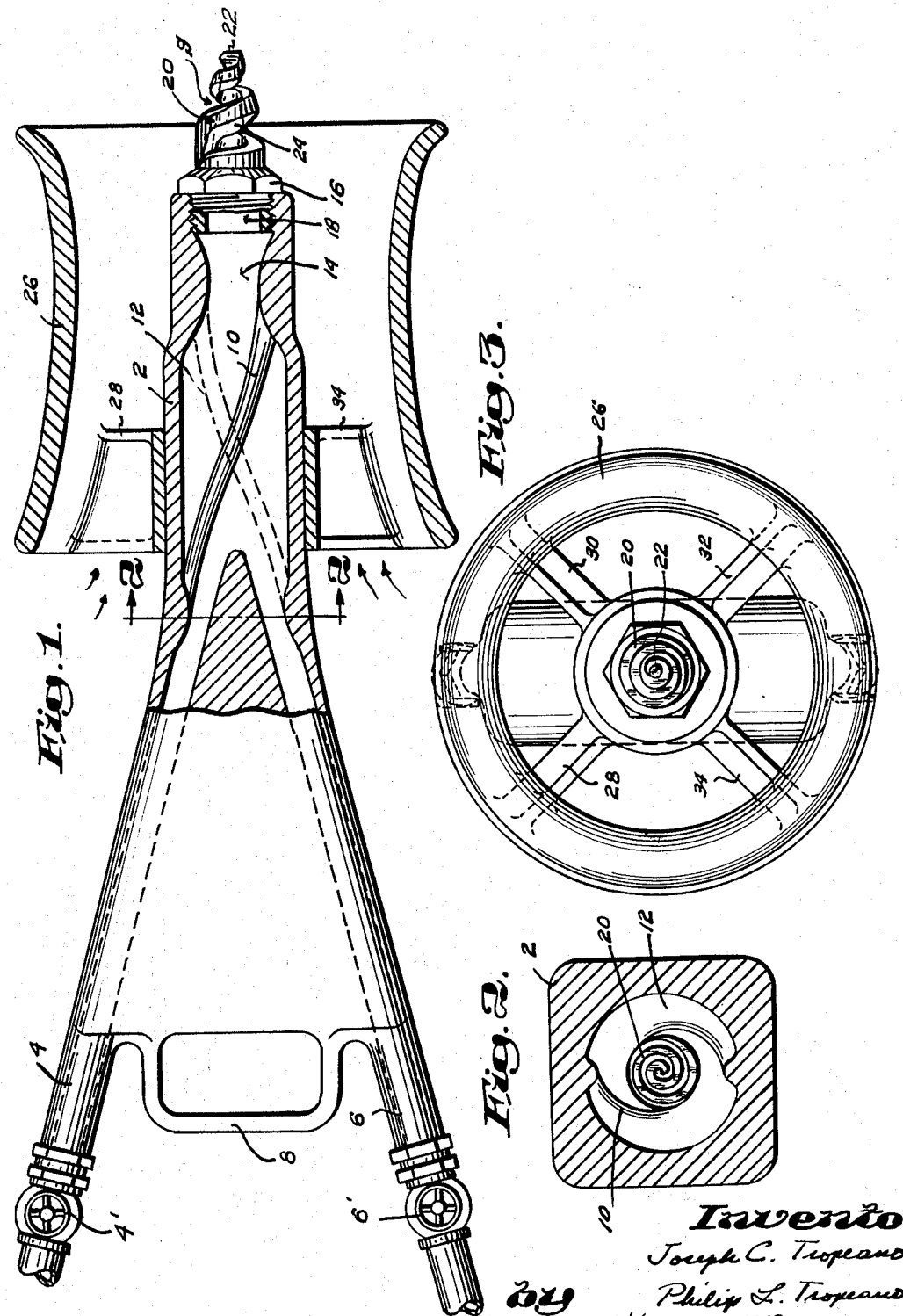

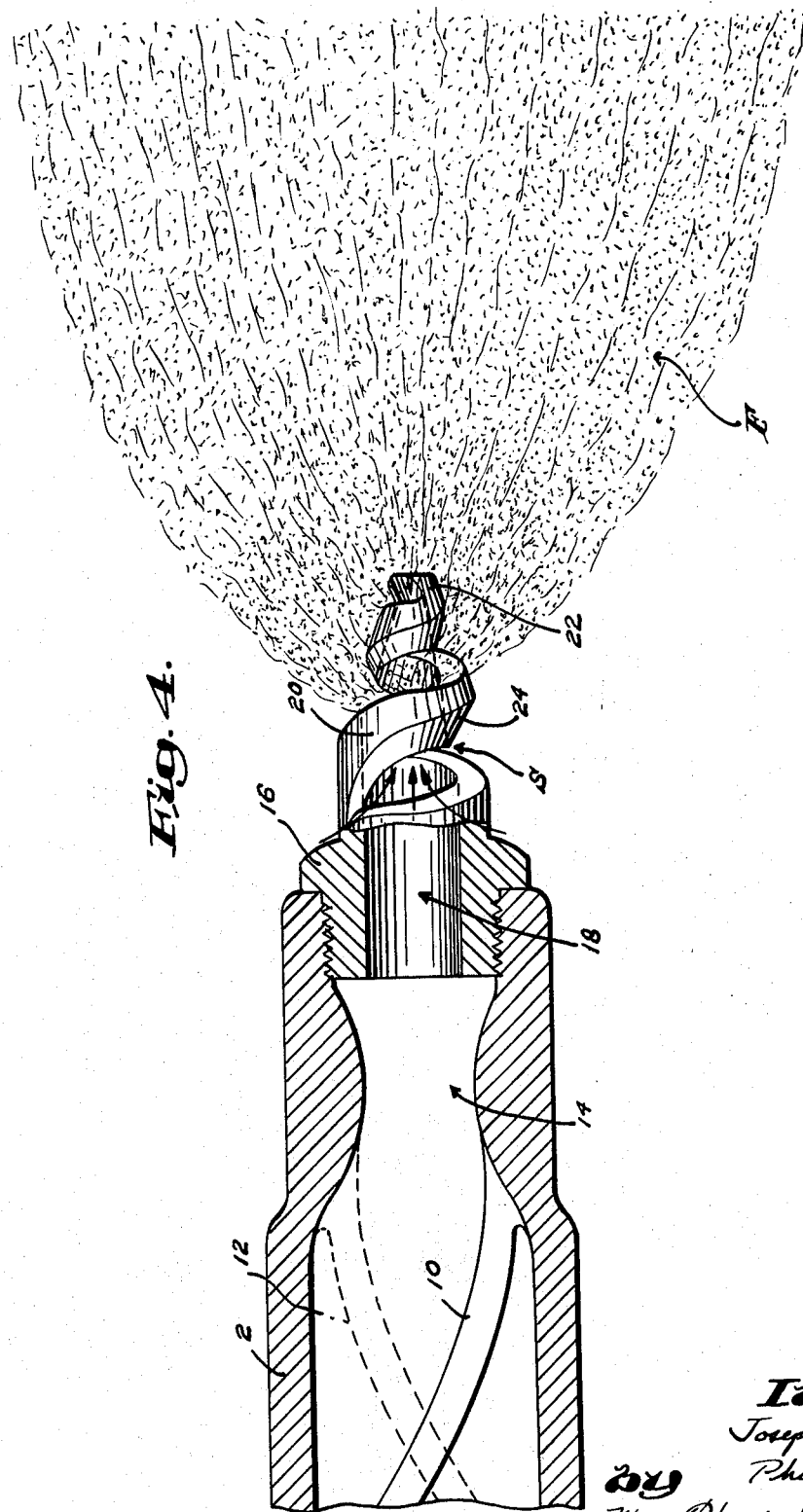

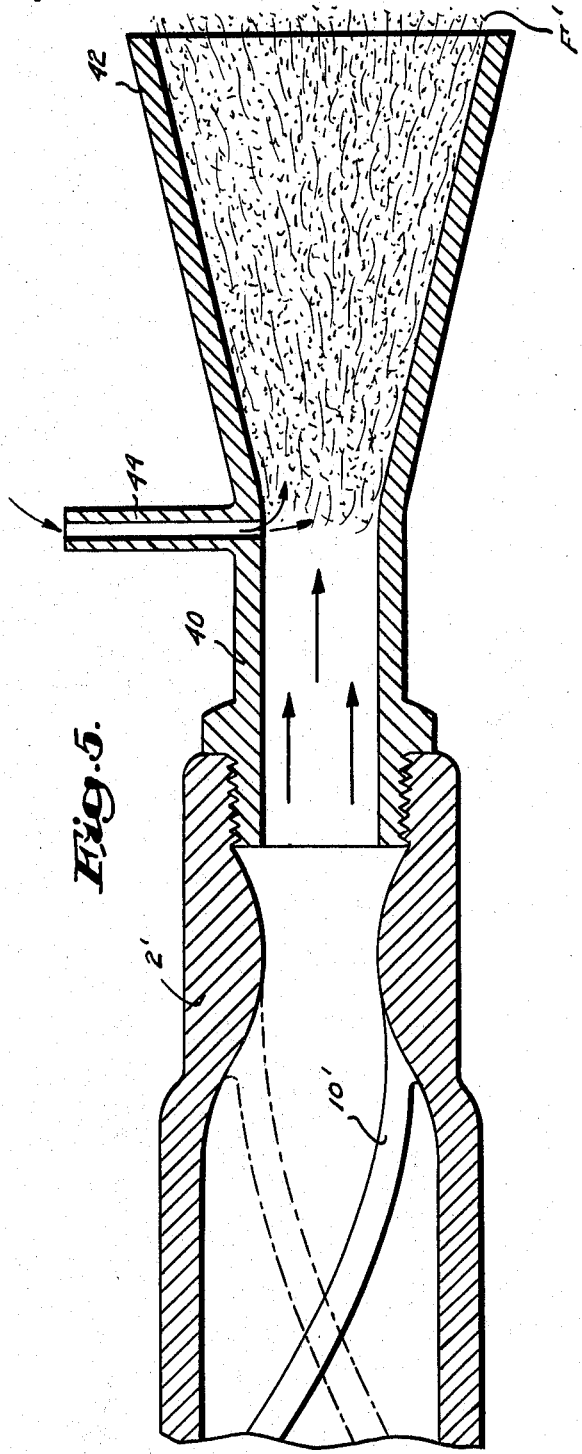

United States Patent Office 3,301,485
Patented Jan. 31, 1967

3,301,485
METHOD AND APPARATUS FOR MAKING
FROZEN PARTICLES
Joseph C. Tropeano, 20 Revere St., and Philip L. Tropeano, 12 Revere St., both of Lexington, Mass. 02173
Filed Sept. 14, 1964, Ser. No. 396,227
9 Claims. (Cl. 239—2)

This invention relates to a method and apparatus for mixing together a pressurized stream of water and compressed air and discharging the resulting mixture in a relatively cold ambient atmosphere to produce a spray of frozen particles. The method of the invention, in one preferred embodiment thereof, is employed in making snow, and the frozen particles of snow are allowed to settle to the ground in the form of a blanket or layer of snow on ski slopes and similar areas.

In the conventional method of making snow for ski areas, it is customary to force a mixture of water and compressed air through an inclined nozzle so that atomized particles of water becoming exposed to air at a freezing temperature of 32° F. or below are caused to solidify while air-borne and thereafter settle to the ground to form a snow cover.

The method described is subject to several limiting conditions. The particles formed by conventionally used compressed air pressures are expensive to produce, tend to assume a rather minute size so that they are easily blown away, and if sunlight is present the particles may tend to become melted or dissipated before they reach the ground. One result of these problems has been a tendency to limit snow-making to night operation, or at least to practicing the invention in the day time only when relatively cold temperatures substantially below 32° F. are available, all of which imposes undesirable conditions on the snow-making process and the extent to which it can be used practically in ski areas especially.

With these limiting factors in mind, we have conceived of an improved method and apparatus for making frozen particles whereby initially formed frozen particles are caused to come into contact with cold air in a novel manner, with theh particles being held in the cold air for substantially longer periods of time than has heretofore been the case, with the result that substantially larger frozen particles may be formed and a number of other important advantages realized.

Our improved method is based on the novel concept of conducting a mixture of compressed air and pressurized water particles in a confined path of travel along which cold ambient air at one or more points is drawn into the flowing mass. This cold ambient air becomes intimately mixed with the mass and is found to provide increased freezing action.

The invention also provides for leading the mixture of compressed air and pressurized liquid along a helical path of travel and releasing the mixture from a nozzle member in a manner such that discharged particles have a substantial rotative movement imparted thereto. As a result of this rotative movement the particles are maintained in an enviroment conductive to freezing for a longer period of time and an appreciable and significant increase in freezing is realized. As a result frozen particles of relatively coarse size are produced and these relatively larger particles are capable of resisting melting and dissipation, and are particularly characterized by a tendency to settle to the ground in an improved manner to form a snow cover of substantially increased thickness in comparison with conventionally formed snow covers for any given time interval.

An outstanding feature of the method described is a very substantial reduction in the magnitude of pressures required for the compressed air as well as the pressurized liquid and this leads to significant savings in the cost and operating expense of compressor equipment.

We have determined that rotative movement of discharged particles may, in accordance with the invention, be induced at any one of several points including at the point of mixing in a mixing chamber, at points just prior to discharge of particles from the mixing chamber through a nozzle member, and at points just after discharge from the nozzle member.

In a preferred form of apparatus for carrying out the method of the invention we introduce pressurized water and compressed air into a tubular mixing chamber which is formed with helical vanes for causing a mass of air and water particles to start to move in a helical path of travel. At the outer extremity or discharge end of the mixing chamber is further provided a conical nozzle element which is formed with a helical slot opening to the atmosphere and presenting helical deflecting surfaces against which the rotating mass is caused to impinge and become further accelerated in a rotative path of travel.

Finally, we provide an exterior air-circulating conduit located in spaced relation around the discharge nozzle in a position to provide for a rotative circulation of air being induced through the air conduit and around the outer portions of a spray of particles which are already moving in a rotary path as they leave the discharge nozzle.

Preferred embodiments of the invention are illustrated in the accompanying drawings in which:

FIGURE 1 is an elevational view with portions of the nozzle and associated structure being shown in cross section;

FIGURE 2 is a cross section taken on the line 2—2 of FIGURE 1;

FIGURE 3 is a front elevational view of the structure shown in FIGURE 1;

FIGURE 4 is a cross sectional view illustrating diagrammatically portions of a snow-making apparatus from which is being discharged a body of snow particles; and FIGURE 5 is a cross sectional view of a modified form of snow-making apparatus.

Considering these structural features in further detail, attention is directed to FIGURES 1 to 4 inclusive in which numeral 2 denotes a tubular mixing chamber into which a pressurized liquid such as water is delivered through a pipe 4 and a compressed gas such as air is furnished through a pipe 6. The pipes 4 and 6 are connected to supply sources for liquid and gas and flow of gas and liquid may, for example, be regulated by means of valves 4' and 6'. A handle 8 provides a gripping surface for moving the mixing chamber into any desired position.

Mixing chamber 2 is formed with internal helical vanes as 10 and 12 which extend radially inwardly for an appreciable distance in a position to guide material coming from the pipes 4 and 6 along a helical path of travel and there is thus imparted to the pressurized mixture an initial rotative movement. At its outer end the mixing chamber 2 is further formed with a restricted passageway 14 into which rotating material may be forced with an increase in velocity.

Connected to the end of the member 2 by threads or other means is a discharge nozzle 16 whose outer end is formed in the shape of a conical helix. The nozzle 16 throughout one part of its length includes a substantially cylindrical bore 18 and at its opposite end is formed with a conically shaped bore defined by a helically formed wall portion 20. The wall portion 20 decreases in its radial dimension with respect to the axis of the nozzle to form a tip 22 and further includes a helically formed slot S and a helical surface 24.

There may also be provided in the preferred embodiment shown in FIGURES 1 to 3 an outer air conduit member 26 which is constructed of a size such that it extends around the mixing chamber in spaced relation to the nozzle 16. The conduit member 26 is preferably formed in the shape of a venturi tube with a restricted central section as shown. A feature of the air conduit 26 is that it is rigidly supported on helically shaped vanes fixed to the mixing chamber and denoted by numerals 28–30–32 and 34. The helical vanes noted are turned in the same direction as the helically formed wall portion 20.

We have found that an outer air conduit such as member 26 is capable of producing a novel function in sucking air in through the rear end of the conduit and discharging it through the front end of the conduit in response to the suction force which is produced when high velocity streams of particles are discharged from the end of the nozzle 16. As this flow of air is caused to take place through member 26 it is drawn through the helical vanes 28–30–32 and 34 with the result that a positive rotative movement of travel of the air is induced. This rapidly revolving current of air leaves the outer end of the air conduit 26 in a manner such that it tends to circulate around and envelop the spray of particles that are being discharged from the nozzle 16. There is thus produced an additional rotative force for causing the sprayed particles to move outwardly in a rotative path of travel for a greater distance. As a result the increased rotative momentum of the particles enables them to undergo a longer period of exposure in a cold ambient atmosphere and an additional freezing action is realized to further increase the size of the particles.

In FIGURE 4 there is illustrated diagrammatically a spray of particles which is generally denoted by the letter F and it will be understood that it is this conical shaped spray of frozen particles which is surrounded by the outer current of air from member 26 and caused to remain in a rotatively suspended state for an increased interval of time.

The addition of small amounts of ambient air into the flow of material while in a confined state may also be accomplished satisfactorily by other means than the nozzle 16. For example, as shown in FIGURE 5, we may provide at the end of a mixing chamber 2' a tubular member 40 having a diverging outlet nozzle portion 42 through which a spray of frozen particles F' is discharged. In this tubular body 40 is located an inlet tube 44 which communicates with the interior of the tubular body and through which cold ambient air may be drawn in by the suction of the material passing out through the nozzle end 42. Other arrangements for introducing cold ambient air into the confined stream may also be employed. Similarly, we may desire to resort to other forms of imparting rotative movement of particles leaving a discharge nozzle and we may desire to employ any of the means for rotating particles separately or in conjunction with one another.

The invention and apparatus described has been directed specifically to the art of making snow for ski slopes and the like. However, it should be understood that we may desire to employ the method of making frozen particles in connection with other operations such as refrigerating food products and producing layers of frozen particles and various other uses.

The method and apparatus disclosed has been subjected to careful testing and has been found to produce highly unexpected and improved results in snow-making as indicated by the specific examples noted below.

EXAMPLE I

A snow-making operation was started on a ski slope area with ambient temperature in the surrounding area of 22° F. and a wind velocity varying from between 25 to 30 miles per hour. The apparatus was supplied with water under pressure of 50 p.s.i. and compressed air delivered under a pressure of 55 p.s.i. The apparatus was operated for a period of roughly one hour. The following snow production was observed—

| | | | | | | |
|---|---|---|---|---|---|---|
| Distance from nozzle | 10' | 20' | 30' | 40' | 50' | 55' |
| Snow in inches | 2" | 4" | 2½" | 1½" | ¾" | ½" |

*Conventional snow-making jet nozzle*

[Water pressure, 75 p.s.i.—Air pressure, 85 p.s.i.]

| | | | | | | |
|---|---|---|---|---|---|---|
| Distance from nozzle | 10' | 20' | 30' | 40' | 50' | 55' |
| Snow in inches | 1½" | 1" | ¾" | ½" | ¼" | Trace |

EXAMPLE II

A snow-making operation was started on a ski slope area with ambient temperature in the surrounding area of 27° F. and a wind velocity varying from between 25 to 30 miles per hour. The apparatus was supplied with water under pressure of 45 p.s.i. and compressed air delivered under a pressure of 60 p.s.i. The apparatus was operated for a period of roughly one hour. The following snow production was observed—

| | | | | | | |
|---|---|---|---|---|---|---|
| Distance from nozzle | 10' | 20' | 30' | 40' | 50' | 55' |
| Snow in inches | 5" | 5" | 2¾" | 2" | ¾" | ½" |

*Conventional snow-making jet nozzle*

[Water pressure, 75 p.s.i.—Air pressure, 85 p.s.i.]

| | | | | | | |
|---|---|---|---|---|---|---|
| Distance from nozzle | 10' | 20' | 30' | 40' | 50' | 55' |
| Snow in inches | 1" | 2¼" | 1¼" | ¾" | ½" | Trace |

EXAMPLE III

A snow-making operation was started on a ski slope area with ambient temperature in the surrounding area of 14° F. and a wind velocity varying from between 10 to 15 miles per hour. The apparatus was supplied with water under pressure of 45 p.s.i. and compressed air delivered under a pressure of 65 p.s.i. The apparatus was operated for a period of roughly one hour. The following snow production was observed—

| | | | | | | |
|---|---|---|---|---|---|---|
| Distance from nozzle | 10' | 20' | 30' | 40' | 50' | 55' |
| Snow in inches | 8" | 6" | 5" | 4" | 3½" | 3" |

*Conventional snow-making jet nozzle*

[Water pressure, 75 p.s.i.—Air pressure, 80–90 p.s.i.]

| | | | | | | |
|---|---|---|---|---|---|---|
| Distance from nozzle | 10' | 20' | 30' | 40' | 50' | 55' |
| Snow in inches | 3" | 2½" | 2" | 2" | 1½" | 1½" |

EXAMPLE IV

A snow-making operation was started on a ski slope area with ambient temperature in the surrounding area of 25° F. and a wind velocity varying from between 15 to 20 miles per hour, the snow-making operation being carried out in direct sunlight. The apparatus was supplied with water under pressure of 45 p.s.i. and compressed air delivered under a pressure of 65 p.s.i. The apparatus was operated for a period of roughly one hour. The following snow production was observed—

| Distance from nozzle | 10′ | 20′ | 30′ | 40′ | 50′ | 55′ |
|---|---|---|---|---|---|---|
| Snow in inches | 6″ | 5″ | 3½″ | 2″ | 3″ | 0* |

*Direct into wind.

*Conventional snow-making jet nozzle*

[Water pressure, 75 p.s.i.—Air pressure, 80–90 p.s.i.]

| Distance from nozzle | 10′ | 20′ | 30′ | 40′ | 50′ | 55′ |
|---|---|---|---|---|---|---|
| Snow in inches | 1½″ | 1″ | 1″ | ½″ | Trace | (*) |

*Absorbed by upward draft and wind.

The above examples clearly demonstrate the increased snow-making efficiency of the method and apparatus of the invention. It is pointed out that much lower pressures for the water supply and the compressed air are being utilized as compared with conventional water pressure and air pressure of 75 p.s.i. and 85 p.s.i. respectively. It should be noted that the expense of a relatively large horsepower output compressor may range all the way from $8,000 to $10,000 and as high as $12,000. Lower horsepower rated compressors in the 40 to 50 horsepower range, which may be suitable for use, can be obtained for substantially lower prices. The result may well be a significantly lowered operating cost per hour for any given unit per quantity of snow delivered upon the ski slope area.

While we have shown preferred embodiments of the invention, it should be understood that various changes and modifications may be resorted to in keeping with the scope of the appended claims.

We claim:

1. A method of making frozen particles from a liquid material which comprises conducting into a mixing chamber flows of compressed air and pressurized liquid to form a mass of atomized liquid particles, introducing into the mass of atomized particles while in a confined state a volume of aspirated cold ambient air and discharging the mass against helical deflecting surfaces and dispersing the atomized particles into an ambient freezing atmosphere to provide a rotating mass of conically diverging particles which occur in a frozen state.

2. That improved method which comprises introducing independently supplied flows of compressed air and pressurized liquid into a tubular mixing chamber, conducting the mixture of compressed air and liquid into a restricted conically shaped passageway at increased velocity, and deflecting the high velocity mixture against helical deflecting surfaces outwardly from the conical passageway into a cold ambient atmosphere to produce a rotative air-borne mass of frozen particles, and simultaneously circulating an independent flow of air around the deflected high velocity mixture to extend the distance of travel of the said mixture.

3. That improved method which provides continuously directing independently supplied flows of compressed gas and pressurized liquid into a tubular mixing chamber in which the mixture is caused to impinge against conical vane surfaces to produce a helically rotating stream, conducting the helically rotating stream into a restricted conically shaped passageway, introducing into the stream while in a confined state small amounts of a relatively cold ambient atmosphere and discharging the resulting mixture into cold ambient atmosphere to produce a rotatively airborne mass of frozen particles.

4. That improved method which provides continuously directing independently supplied flows of compressed gas and pressurized liquid into a tubular mixing chamber in which the mixture is caused to impinge against conical vane surfaces to produce a helically rotating stream, conducting the helically rotating stream into a restricted conically shaped passageway, introducing into the stream while in a confined state small amounts of a relatively cold ambient atmosphere and deflecting the resulting mixture outwardly from the conical passageway against helical deflecting surfaces into a cold ambient atmosphere to provide a conically dispersed rotating suspension of frozen particles.

5. That improved method which provides continuously directing independently supplied flows of compressed gas and pressurized liquid into a tubular mixing chamber in which the mixture is caused to impinge against conical vane surfaces to produce a helically rotating stream, conducting the helically rotating stream into a restricted conically shaped passageway, introducing into the stream while in a confined state small amounts of a relatively cold ambient atmosphere and discharging the resulting mixture into cold ambient atmosphere to produce a rotatively airborne mass of frozen particles, and simultaneously supporting the conically dispersed rotating mass as it leaves the helical deflecting surfaces with a revolving current of ambient air to extend the period in which the rotating particles remain in a state of rotative movement.

6. Apparatus for making snow comprising means for providing a supply of compressed gas and pressurized liquid, a mixing chamber connected to the said means and including a restricted passageway, air inlet means communicating with the restricted passageway for admitting aspirated air into a stream of gas and liquid passing through the restricted passageway and nozzle means connected to the mixing chamber for discharging a supply of the resulting mixture into a relatively cold ambient atmosphere to produce frozen particles, said nozzle means comprising a cylindrical portion having a conical tip, said cylindrical portion being formed at its point of connection with a cylindrical bore which decreases in diameter to provide a cylindrical bore through the conical tip, and said conical tip being formed with a helical slot communicating with the cylindrical bore, one side of the helical slot being defined by a helical deflecting surface.

7. That improved method which comprises bringing together independently supplied flows of compressed gas and pressurized liquid in a restricted passageway to provide a high velocity stream, introducing into the stream while in a confined state small quantities of a relatively cold ambient atmosphere and releasing the resulting mixture into cold ambient atmosphere to produce a mass of suspended frozen particles and outer air conduit means supported in spaced relation around the nozzle means and having supporting conical vanes through which air may be sucked through the conduit in a rotary path of travel in response to discharge of material from the said nozzle.

8. Apparatus for making snow comprising means for providing a supply of compressed gas and pressurized liquid, a mixing chamber connected to the said means and including a restricted passageway, nozzle means having an outlet for discharging material from the said mixing chamber into a relatively cold ambient atmosphere in a helically moving expanding path of flow, conduit means formed with internal helical deflecting surfaces and supported in spaced relation around the mixing chamber, said conduit means terminating at points adjacent the outlet of the nozzle means in a position to provide for an independent circulation of air into the ambient atmosphere and around the expanded mixture discharged from the said nozzle thereby to extend the distance of travel of the discharged material.

9. Apparatus for making snow comprising means for providing a supply of compressed gas and pressurized liquid, a mixing chamber connected to the said means and including a restricted passage way, air inlet means communicating with the restricted passageway for admitting aspirated air into a stream of gas and liquid passing through the restricted passageway and nozzle means connected to the mixing chamber for discharging a supply of the resulting mixture into a relatively cold ambient atmosphere to produce frozen particles, said nozzle means comprising a cylindrical portion having a conical tip, said cylindrical portion being formed at its point of connection with a cylindrical bore which decreases in diameter to provide a cylindrical bore through the conical tip, said conical tip being formed with a helical slot communicating with the cylindrical bore, one side of the helical slot being defined by a helical deflecting surface, and conduit means supported in spaced relation around the mixing chamber and nozzle for inducing an independent flow of helically moving air around material discharged from the nozzle.

References Cited by the Examiner

UNITED STATES PATENTS

| | | | |
|---|---|---|---|
| 428,587 | 5/1890 | Avery et al. | 239—402 |
| 998,762 | 7/1911 | Faller | 169—15 |
| 1,549,537 | 8/1925 | Hansen | 239—501 |
| 2,676,471 | 4/1954 | Pierce. | |
| 3,146,951 | 9/1964 | Brown | 239—399 |

FOREIGN PATENTS

| | | |
|---|---|---|
| 1,156,341 | 12/1957 | France. |
| 1,372,024 | 8/1964 | France. |
| 673,980 | 4/1939 | Germany. |

EVERETT W. KIRBY, *Primary Examiner.*